(12) United States Patent
Sasada (10) Patent No.: US 6,868,127 B2
(45) Date of Patent: Mar. 15, 2005

(54) SIGNAL RECEIVING CIRCUIT AND SIGNAL RECEIVING METHOD

(75) Inventor: Taisuke Sasada, Tokyo (JP)

(73) Assignee: NEC Corporation, Tokyo (JP)

( * ) Notice: Subject to any disclaimer, the term of this patent is extended or adjusted under 35 U.S.C. 154(b) by 733 days.

(21) Appl. No.: 09/796,447

(22) Filed: Mar. 2, 2001

(65) Prior Publication Data
US 2001/0024478 A1 Sep. 27, 2001

(30) Foreign Application Priority Data
Mar. 3, 2000 (JP) .......................................... 200-059265

(51) Int. Cl.[7] .................................................. H04L 7/00
(52) U.S. Cl. ........................ 375/316; 375/355; 341/61
(58) Field of Search ................................ 375/232, 354, 375/355, 316, 340; 708/322, 323; 341/50, 61

(56) References Cited

U.S. PATENT DOCUMENTS

| | | | | |
|---|---|---|---|---|
| 4,620,158 A | * | 10/1986 | Yasukawa | .................... 375/340 |
| 5,768,311 A | * | 6/1998 | Betts et al. | ................... 375/222 |
| 6,111,920 A | * | 8/2000 | Alelyunas et al. | .......... 375/326 |
| 6,163,286 A | * | 12/2000 | Lee et al. | .................... 341/143 |
| 6,424,687 B1 | * | 7/2002 | Tian et al. | ................... 375/354 |

FOREIGN PATENT DOCUMENTS

JP        8-32562        2/1996

* cited by examiner

Primary Examiner—Betsy L. Deppe
(74) Attorney, Agent, or Firm—Foley & Lardner LLP (57) ABSTRACT

A signal receiving circuit receives sample data without an occurrence of discontinuity in the received sample data, even if the number of sample data to be transmitted from a transmitting terminal does not coincide with the number of sample data expected to be received by a receiving terminal. The signal receiving circuit has a converting circuit adapted to perform computations on $n_1$ pieces ($n_1$ is a natural number) of first sample data to be sequentially input and to sequentially produce $n_2$ pieces ($n_2$ is a natural number) of second sample data in response to a clock signal, and has a receiving section adapted to sequentially receive the $n_2$ pieces of the second sample data in response to the clock signal.

18 Claims, 7 Drawing Sheets

SIGNAL RECEIVING CIRCUIT AND SIGNAL RECEIVING METHOD

BACKGROUND OF THE INVENTION

1. Field of the Invention

The present invention relates to a signal receiving circuit and a method for receiving signals, and more particularly to the signal receiving circuit and the method for receiving signals used by a receiving terminal carrying out communications with a transmitting terminal in an asynchronous manner.

The present application claims priority of Japanese Patent Application No. 2000-059265 filed on Mar. 3, 2000, which is hereby incorporated by reference.

2. Description of the Related Art

Digital communications for transmitting and receiving digital signals are widely used. In some cases, communications are carried out between terminals via asynchronous transmission, without the use of synchronous signals. Even in the case of asynchronous digital communications, it is desired that a receiving terminal receives signals at the same sampling frequency that a transmitting terminal uses to transmit signals. To achieve this, each of the transmitting and receiving terminals has a clock signal generating circuit adapted to generate a clock signal at the same sampling frequency.

However, it is actually impossible for each of the transmitting and receiving terminals to generate a clock signal at the exact same frequency, and to transmit and receive signals at the exact same sampling frequency. For example, when signals are transmitted and received at a sampling frequency of 16 kHz, a frequency difference of about 40 Hz occurs. This means that the number of pieces of sample data contained in a transmitting signal, which is generated by the transmitting terminal, differs by 4 pieces per one second from the number of pieces of sample data that the receiving terminal is prepared to receive.

When the number of pieces of the sample data contained in the transmitting signal, which is generated by the transmitting terminal, is different from the number of pieces of the sample data to be received by the receiving terminal, the receiving terminal uses a signal receiving circuit adapted to solve the problem of the difference in the number of pieces of data.

Figure 7:
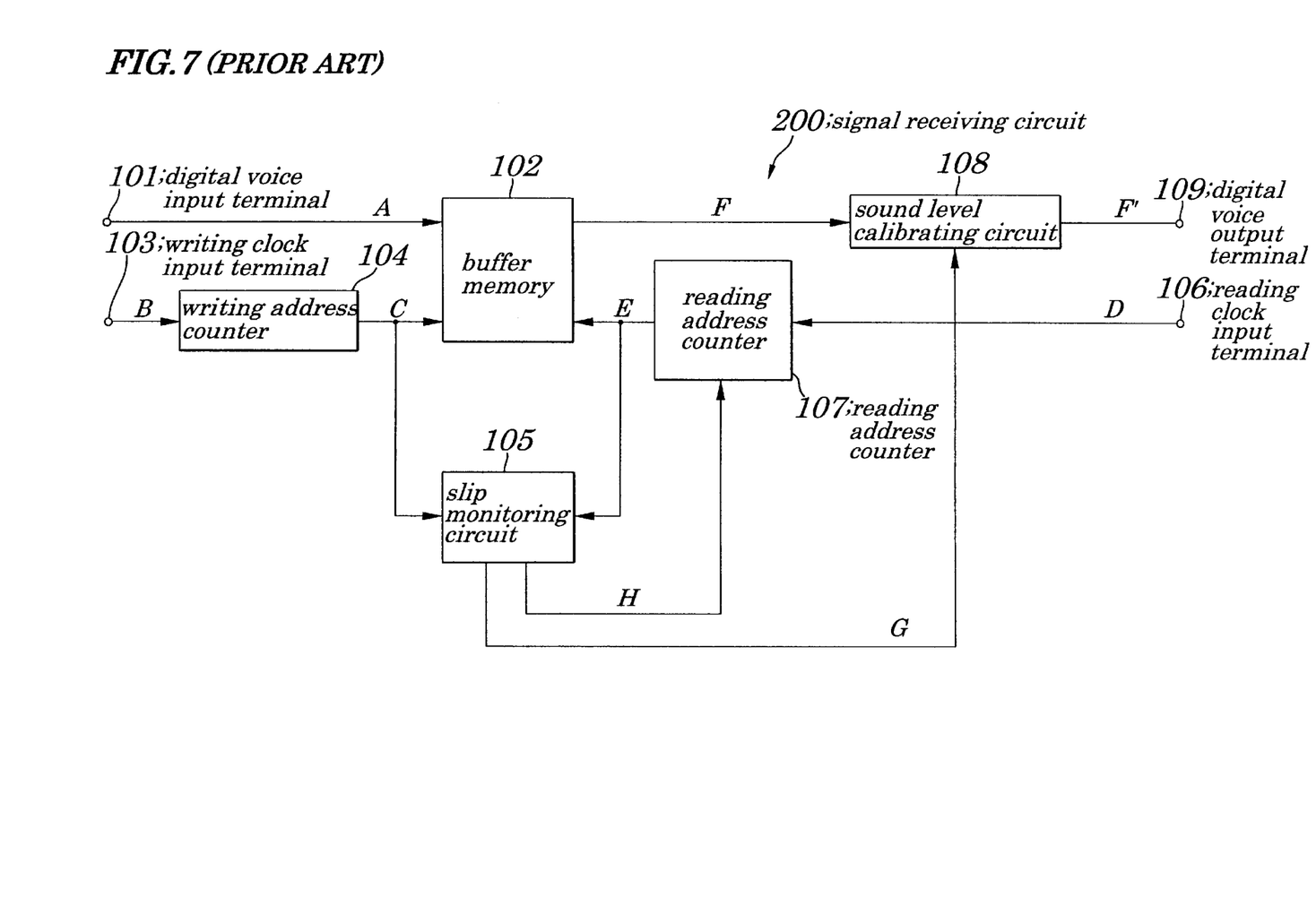
FIG. 7 is a schematic diagram showing configurations of a conventional voice signal receiving circuit.

Such a signal receiving circuit is disclosed in Japanese Patent Application Laid-open No. Hei 8-32562, as shown in FIG. 7. A conventionally known signal receiving circuit 200 is used to receive a digital voice signal. As shown in FIG. 7, the signal receiving circuit 200 is provided with a digital voice input terminal 101. The digital voice input terminal 101 is connected to a buffer memory 102. Moreover, the signal receiving circuit 200 has a writing clock input terminal 103.

The writing clock input terminal 103 is connected to a writing address counter 104. The writing address counter 104 is connected to the buffer memory 102 and to a slip monitoring circuit 105. The signal receiving circuit 200 further has a reading clock input terminal 106. The reading clock input terminal 106 is connected to a reading address counter 107. The reading address counter 107 is connected to the buffer memory 102 and to the slip monitoring circuit 105. The buffer memory 102 is connected to a sound level calibrating circuit 108. The slip monitoring circuit 105 is connected to the sound level calibrating circuit 108. The sound level calibrating circuit 108 is connected to a digital voice output terminal 109.

Operations of the conventional signal receiving circuit 200 will be described. A digital voice input signal A, input from the digital voice input terminal 101, is written into the buffer memory 102 sequentially. A writing clock signal B is input from the writing clock input terminal 103. The writing clock signal B is in sync with the digital voice input signal A. A writing address C is output from the writing address counter 104. A signal carrying the writing address C is in sync with the writing clock signal B. The writing address C is fed to the buffer memory 102. The digital voice input signal A is written to an address designated by the writing address C and stored in the buffer memory 102.

A reading clock signal D is fed to the reading address counter 107 from the reading clock input terminal 106. A reading address E is output from the reading address counter 107. A signal carrying the reading address E is in sync with the reading clock signal D. The reading address E is fed to the buffer memory 102. The buffer memory 102 outputs the signal stored in the address designated by the reading address E as an output digital voice signal F to the sound level calibrating circuit 108.

The writing address C and the reading address E are input to the slip monitoring circuit 105. The slip monitoring circuit 105 monitors the writing address C and the reading address E at all times. The slip monitoring circuit 105 outputs a sound level control starting signal G to the sound level calibrating circuit 108 when the differential between the writing address C and reading address E approaches a predetermined value. The sound level 90 calibrating circuit 108 outputs the output digital voice signal F. When the sound level calibrating circuit 108 receives the sound level control starting signal G, decay begins to occur in the amplitude of an output digital voice signal F'. The sound level calibrating circuit 108 minimizes the amplitude of the output 95 digital voice signal F' ten seconds after the sound level control starting signal G has been input.

The slip monitoring circuit 105, "t1" seconds after the amplitude of the output digital voice signal F' has been minimized, that is, "t0+t1" seconds after the sound level control starting signal G has been input to the sound level calibrating circuit 108, outputs a reading address switching signal H to the reading address counter 107. The reading address E is switched in response to the reading address switching signal H. "t1" seconds after the reading address E has been switched, the amplitude of the output 105 digital voice signal F' gradually increases and the output digital voice signal F' is restored to its original level.

In the signal receiving circuit 200, if the writing clock signal B is not in sync with the signal of the reading address E, a dropout and/or overlap of data occurs. When the dropout and/or 110 overlap of data occurs, the reading address E is switched. Before the reading address E is switched, the output digital voice signal F' is gradually decreased in sound level.

After the reading address E has been switched, the sound level of the output digital voice signal F' is gradually restored to its original level. When the reading address E has been switched, voice noise that has occurred due to the dropout and/or overlap of data is removed. In the conventional signal receiving circuit 200, no further discontinuity in a signal waveform of the output digital voice signal F' occurs.

In the conventional signal receiving circuit 200, if the dropout and/or overlap of data occurs, the amplitude of the output digital voice signal F' is minimized for "t1" seconds. During the "t1" seconds after the dropout and/or overlap has occurred, there is essentially no output in the output digital voice signal F'. For example, when the output digital voice signal F' is output via a speaker, there is a time when no sound is produced. The output digital voice signal F' is discontinuous on a time axis.

It is desired that no discontinuity in the signal waveform contained in sample data to be received by the receiving terminal on the time axis should occur even when the number of pieces of sample data to be transmitted by the transmitting terminal does not coincide with that of sample data to be received by the receiving terminal.

SUMMARY OF THE INVENTION

In view of the above, it is an object of the present invention to provide a signal receiving circuit capable of receiving sample data without causing discontinuity in the received sample data, even when a number of pieces of sample data to be transmitted by a transmitting terminal does not coincide with the number of pieces of sample data to be received by a receiving terminal. According to a first aspect of the present invention, there is provided a signal receiving circuit including:

a converting circuit to perform computations on $n_1$ ($n_1$ is a natural number) pieces of first sample data sequentially input and to sequentially produce $n_2$ ($n_2$ is a natural number) pieces of second sample data in response to a clock signal;

a receiving circuit to sequentially receive the $n_2$ pieces of the second sample data in response to the clock signal;

wherein the number $n_2$ is determined by the clock signal; and wherein the converting circuit outputs, in accordance with a difference between a number of the first sample data input to the converting circuit and a number of the second sample data to be received by the receiving circuit, one previously input piece of the first sample data as one piece of the second sample data included in the $n_2$ pieces of the second sample data, in a delayed manner.

With the above configuration, discontinuity can be prevented from occurring in the $n_2$ pieces of the second sample data.

With the above configuration, the second sampled at a properly expressing the first sample data can be produced.

Also, a preferable mode is one wherein the one piece of the second sample data is one previously input piece of the first sample data input N pieces of sample data before a currently input piece of the first sample data and output in a delayed manner and wherein the value N is a positive number being not less than 0 (zero) and is able to be a value other than an integer.

With the above configuration, the $n_2$ pieces of the second sample data can be changed continuously.

Also, a preferable mode is one wherein the signal receiving circuit has a controller used to produce a control signal in response to the number $n_1$ and the number $n_2$ and the converting circuit includes a computational section used to perform a computation on the plurality of pieces of the first sample data in response to the control signal and to produce the $n_2$ pieces of the second sample data.

Also, a preferable mode is one wherein the computational section has a plurality of storing sections each being used to store one different piece of the first sample data included in the plurality of pieces of the first sample data, a plurality of multipliers each being used to output a computational result obtained by multiplying one different piece of the first sample data by a predetermined coefficient Aj and an adder used to do addition of the computational results to obtain a sum and to output the sum as one piece of second sample data included in the plurality of pieces of the second sample data.

Also, a preferable mode is one wherein the predetermined coefficient $A_j$ used in the plurality of the multipliers is obtained by an equation:

$$Aj = \frac{\sin(k+\delta-j)}{(k+\delta-j)\pi} h(k+\delta-j)$$

where "n" is a number of multipliers making up the plurality of pieces of the multipliers, "j" is an integer from 1 to n, "k" is a natural number being larger than 1 and being smaller than "n", and "h(i)" represents a window function. The value "δ" is determined in response to the control signal.

Also, a preferable mode is one wherein the value "h(i)" is a Hamming function.

With the above configuration, since the predetermined coefficient $A_j$ has the window function as a factor, at a frequency being not more than a cut-off frequency, again of the converting circuit is not influenced by frequency and therefore the "h(i)" can be the Hamming factor.

Also, a preferable mode is one wherein the predetermined coefficient $A_j$ used in the plurality of the multipliers is obtained by an equation:

$$Aj = \frac{\sin(k+\delta-j)\pi}{(k+\delta-j)\pi}$$

where "n" is a number of multipliers making up the plurality of the multipliers, "j" is an integer from 1 to n and "k" is a natural number being larger than 1 and being smaller than "n". The value "δ" is determined in response to the control signal.

Also, a preferable mode is one wherein, every time the receiving circuit receives the second sample data, a difference ($N_1-N_2$) between a number $N_1$ of the first sample data to be input to the converting circuit for a specified period and a number $N_2$ of the second sample data to be received by the receiving circuit for the specified period is used to determine the value "δ" and, every time the receiving circuit receives the second sample data, the value "δ" comes close to 0 (zero) by a specified value.

With the above configuration, the number of sample data by which the first sample data is output in a delayed manner is changed continuously.

According to a second aspect of the present invention, there is provided a digital voice signal receiving circuit provided with signal receiving circuits as stated above, wherein $n_1$ pieces of first sample data and $n_2$ pieces of second sample data are digital voice data.

With the above configuration, discontinuity of received digital voice data is held down, thus enabling elimination of noise.

According to a third aspect of the present invention, there is provided a method for receiving signals including:

a step of performing sequential computations on $n_1$ ($n_1$ is a natural number) pieces of first sample data to determine output of second sample data;

a step of producing $n_2$ ($n_2$ is a natural number) pieces of second sample data in response to a clock signal;

a step of sequentially receiving the second sample data in response to the clock signal;

wherein the number $n_2$ is determined by the clock signal; and wherein the step of producing the $n_2$ pieces of second sample data includes a step of outputting, in accordance with a difference between a number of the first sample data and a number of the second sample data to be received by a receiving section, one piece of the first sample data existing backward, contained in the plurality of pieces of the first sample data, as one piece of the second sample data contained in the $n_2$ pieces of the second sample data, in a delayed manner.

With the above configuration, discontinuity in the $n_2$ pieces of the second sample data is difficult to occur.

Also, a preferable mode is one wherein the one piece of the second sample data is the one previously input piece of the first sample data input N pieces of sample data before a currently input piece of said first sample data and output in a delayed manner and wherein the value N is a positive number being not less than 0 (zero) and is able to be a value other than an integer.

Also, a preferable mode is one wherein the step of producing the $n_2$ pieces of second sample data includes a step of using a value y calculated by an equation:

$$y = \sum_{j=1}^{n} \frac{\sin(k+\delta-j)\pi}{(k+\delta-j)\pi} Dj$$

as one piece of the second sample data included in the $n_2$ pieces of second sample data, where each of $D_1, D_2, \ldots, D_n$ (n is a natural number being not less than 2) is a value of each of the plurality of pieces of the first sample data, "j" is an integer from 1 to n, "k" is a natural number-being larger than 1 and smaller than n and wherein the step of producing the $n_2$ pieces of second sample data includes a step of calibrating a value "δ" being a number determined in accordance with a difference between the number $n_1$ and the number $n_2$.

Also, a preferable mode is one wherein the step of producing the $n_2$ pieces of second sample data includes a step of using a value y calculated by an equation:

$$y = \sum_{j=1}^{n} \frac{\sin(k+\delta-j)\pi}{(k+\delta-j)\pi} h(k+\delta-j) Dj$$

as one piece of the second sample data included in the $n_2$ pieces of the second sample data, where each of $D_1, D_2, \ldots, D_n$ (n is a natural number being not less than 2) is a value of each of the plurality of pieces of the first sample data, "j" is an integer from 1 to n, "k" is a natural number being larger than 1 and smaller than n and "h(i)" represents a window function and wherein the step of producing the $n_2$ pieces of second sample data includes a step of calibrating a value "δ" being a number determined in accordance with a difference between the number $n_1$ and the number $n_2$.

With the above configuration, since the one piece of the second sample data is produced using the window function "h(i)", at a frequency being not more than a cut-off frequency, a gain of the converting circuit is not influenced by frequency.

Also, a preferable mode is one wherein the value "h(i)" is a Hamming function.

Furthermore, a preferable mode is one wherein, every time the second sample data is received in response to a clock signal, a difference $(N_1-N_2)$ between a number $N_1$ of the first sample data to be input for a specified period and a number $N_2$ of the second sample data to be received for the specified period is used to determine the value "δ" and, every time the second sample data is received in response to a clock signal, the value "δ" comes close to 0 (zero) by a specified value.

According to a fourth aspect of the present invention, there is provided a method for receiving digital voice signals using methods for receiving signals stated above, wherein $n_1$ pieces of first sample data and $n_2$ pieces of second sample data are digital data which shows a voice.

With the above aspects, even if the number of the sample data to be transmitted from the transmitting terminal does not coincide with that of the sample data to be received by the receiving terminal, the sample data can be received without the occurrence of discontinuity in the received sample data.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENT

Best modes of carrying out the present invention will be described in further detail using various embodiments with reference to the accompanying drawings.

Embodiment

Figure 1:
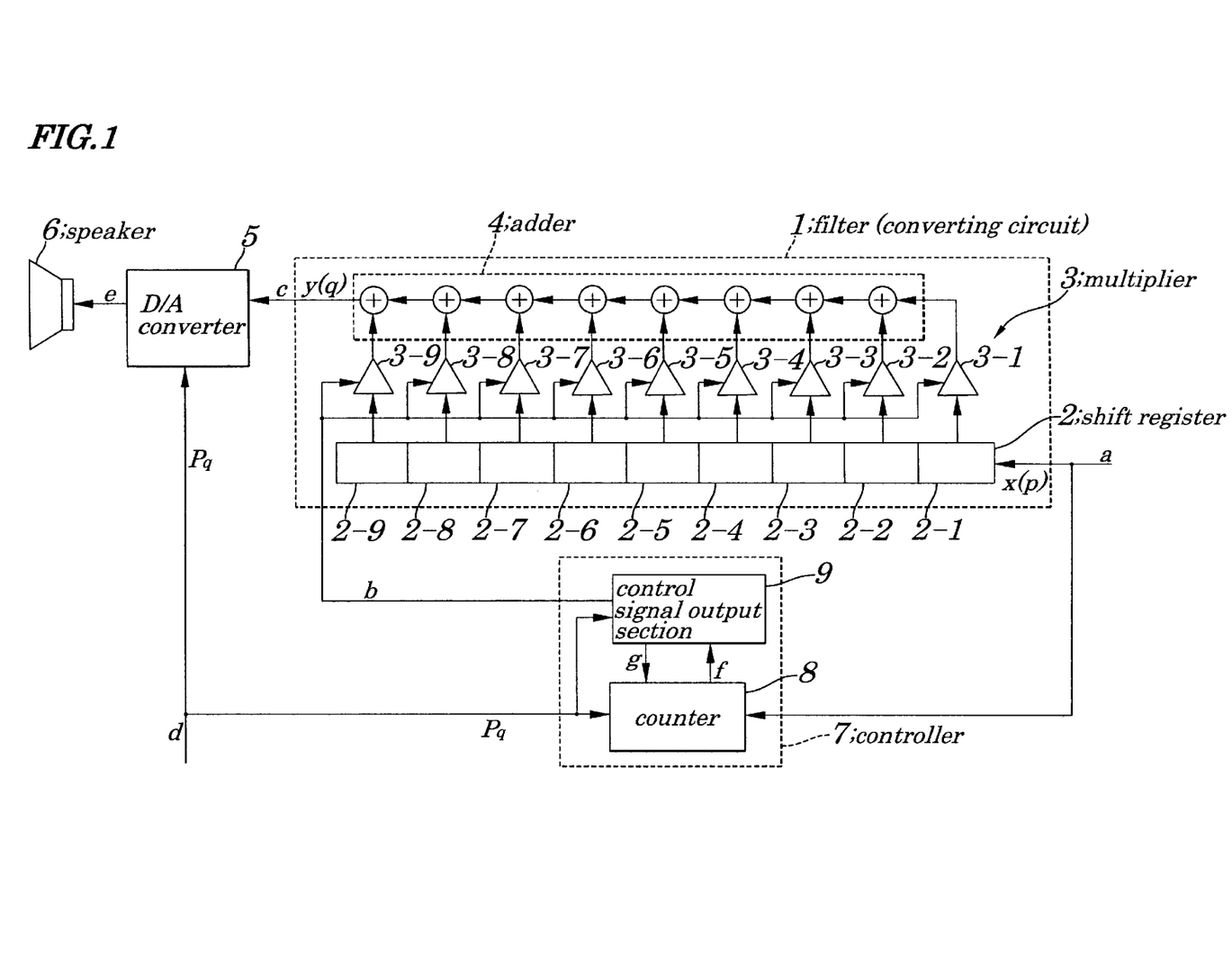
FIG. 1 is a schematic block diagram showing configurations of a signal receiving circuit according to an embodiment of the present invention.

FIG. 1 is a schematic block diagram showing configurations of a signal receiving circuit according to an embodiment of the present invention. The signal receiving circuit of the embodiment is used to receive a digital voice signal. As shown in FIG. 1, the signal receiving circuit is provided with a filter 1 to which a transmitting signal "a" is input.

The filter 1 is an r-th order FIR (Finite Impulse Response) filter. The "r" is a natural number being not less than three.

In this embodiment, "r"=9. The filter 1 has a shift register 2. The transmitting signal "a" is input to the shift register 2.

The shift register 2 includes registers 2-1 to 2-9. To an input terminal of the register 2-1 is input the transmitting signal "a". An output of the register 2-1 is input to the register 2-2. An output of the register 2-2 is input to the register 2-3. Similarly, outputs of the register "2-(i-1)" are input to the register "2-i". The "i" is a natural number being not less than two and being not more than nine.

The shift register 2 is connected to a multiplier 3. The multiplier 3 includes multipliers 3-1 to 3-9. An output of the register 2-1 is input to the multiplier 3-1. An output of the register 2-2 is input to the multiplier 3-2. Similarly, outputs of the registers 2-j are input to the multipliers 3-j. The "j" is a natural number being not more than nine. Outputs of the multipliers 3-1 to 3-9 are input to an adder 4. The adder 4 outputs a receiving signal "c".

The receiving signal "c" is input to a D/A (Digital/Analog) converter 5. To the D/A converter 5 is input a receiving clock signal "d". The D/A converter 5 is connected to a speaker 6.

The signal receiving circuit of the embodiment further includes a controller 7. The controller 7 has a counter 8 and a control signal output section 9. To the counter 8 are input both the transmitting signal "a" and the receiving clock signal "d". The counter 8 is connected to the control signal output section 9.

Figure 2A:
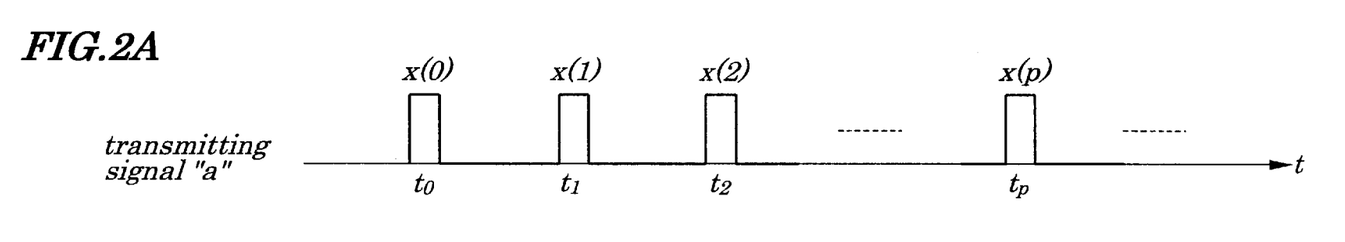
FIG. 2A is a diagram showing transmitting sample data used in the signal receiving circuit according to the embodiment of the present invention.

Next, operations of the signal receiving circuit of the embodiment will be described below. The transmitting signal "a" is input to the filter 1and to the controller 7. The transmitting signal "a" is the digital voice signal. The transmitting signal "all, as shown in FIG. 2A, includes transmitting sample data x(0), x(1), . . . , x(p). The "p" is an arbitrary integer being not less than zero.

At time t=t0, the transmitting sample data x(0) is input to the filter 1 and the controller 7. At time t=t1, the transmitting sample data x(1) is input to the filter 1 and the controller 7. Similarly, at time t=tp, the transmitting sample data x(p) is input to the filter 1 and the controller 7. The time is assumed to be t0<t1< . . . <tp<tp+1< . . . .

Each of the transmitting sample data x(0), x(1), . . . , x(p), . . . is made up of 16 bits. The "p" is an arbitrary integer being not less than zero. The number of bits making up the transmitting sample data may be some other number of bits.

The filter 1, in response to a control signal "b" produced by the controller 7, converts the transmitting signal "a" to the receiving signal "c". The filter 1 outputs the receiving signal "c" to the D/A converter 5. The controller 7, in response to the transmitting signal "a" and the receiving clock signal "d", produces the control signal "b".

A process of producing the control signal "b" will be described below. The transmitting signal "all is input to the counter 8. The counter 8 holds a counter value "K". The counter 8 increases the counter value "K" by one each time one of the transmitting sample date x(0), x(1), . . . , x(p), . . . is input. The "p" is an arbitrary integer being not less than zero.

Figure 2B:
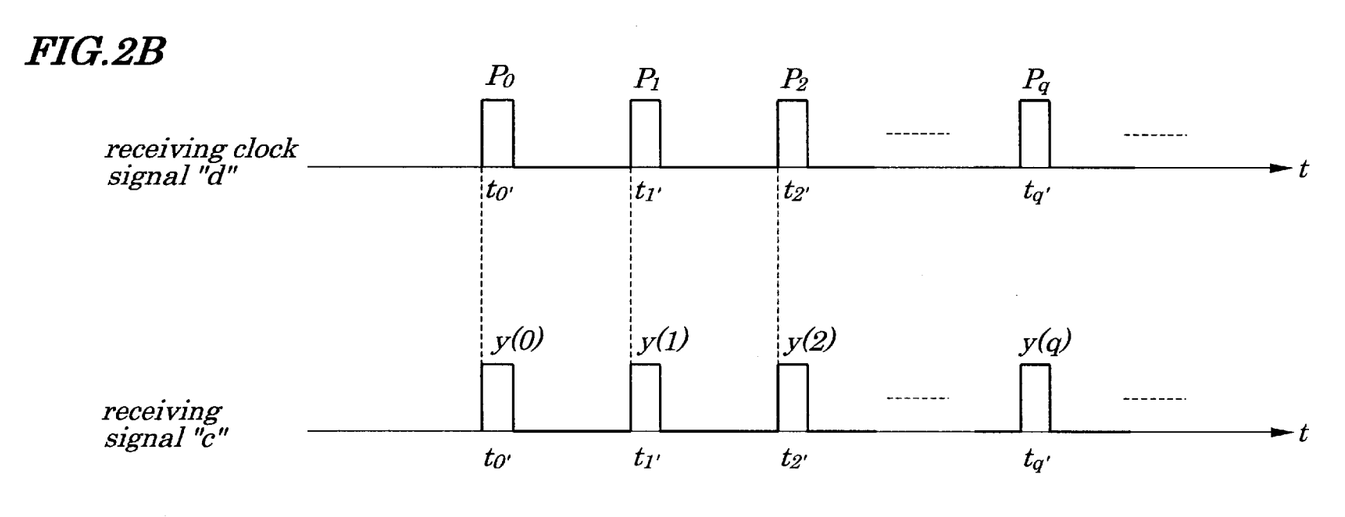
FIG. 2B is a diagram showing clock pulses and receiving sample data used in the signal receiving circuit according to the embodiment of the present invention.

Moreover, to the counter 8 is input the receiving clock signal "d". As shown in FIG. 2B, the receiving clock signal "d" has clock pulses $P_0, P_1, P_2, \ldots, P_q, \ldots$. The "q" is an arbitrary integer being not less than zero. The clock pulse $P_0$ is input to the counter 8 at time t=t0'. Let it be assumed here that t0<t0'.

The clock pulse $P_1$ is input to the counter 8 at time t=t1' Similarly, the clock pulse $P_q$ is input to the counter 8 at time t=tq'.

The counter 8 decreases the counter value K by one each time one of the clock pulses $P_0, P_1, P_2, \ldots, P_q, \ldots$ is input. The "q" is an arbitrary integer being not less than zero. After the counter value has been decreased by one due to inputting of the clock pulse $P_0$, the resulting counter value K is assigned to the control value δ(0). Similarly, after the counter value has been decreased by one due to inputting of the clock pulse $P_q$, the resulting counter value K is assigned to the control value δ(q). The control value δ(q) is transferred to the control signal output section 9 via a counter signal "f".

To the control signal output section 8 is input the receiving clock signal "d". At approximately the same time the clock pulse $P_q$ contained in the receiving clock signal "d" is input to the control signal output section 9, the clock pulse $P_q$ is input to the counter 8.

The control signal output section 9 captures the control value δ(0) when the clock pulse $P_0$ is input. Similarly, the control signal output section 9 captures the control value δ(q) when the clock pulse $P_q$ is input. The "q" is an arbitrary integer being not less than zero. The control signal output section 9 transfers the control value δ(q) to the filter 1, via the control signal "b", when the clock pulse $P_q$ is input.

The control signal output section 9 outputs a counter control signal "g" to the counter 8, after transferring the control value δ(q) to the filter 1 via the control signal "b". The counter control signal "g" instructs the counter 8 to increase the counter value K by Δx or to decrease the counter value K by Δx. It is assumed that 0<Δx<0.5.

In response to the counter control signal "g", the counter 8 performs the following operations. That is, when −Km≦δ (q)≦Km ("q" is an arbitrary integer being not less than zero), the counter 8 holds the counter value K as it is. The "Km" is an integer being not less than zero. When δ(q)>Km, the counter 8 decreases the counter value K by Δx. When δ(q)<−Km, the counter 8 increases the counter value K by Δx. Δx is not an integer. Therefore, the counter value K is also not an integer, as it can be modified by Δx. The result of increasing the counter value K by Δx or decreasing the counter value K by Δx is reflected in the control value δ(q+1), which is transferred by the control signal "b" when the clock pulse $P_{q+1}$ is input. Since the counter value K held by the counter 8 is not an integer and the control value δ(q+1) is determined by the counter value K, the control value δ(q+1) is also not an integer ("q" is an integer being not less than zero).

Processes of producing the control signal "b" are described above. The following explains the processes of filter 1 that convert the transmitting signal "a" into the receiving signal "c" in response to the control signal "b".

The transmitting signal "a" is input to the register 2-1 included in the filter 1. The transmitting signal "a" includes transmitting sample data x(0), x(1), . . . , x(p), . . . .

Each of the registers 2-1 to 2-9 stores each of the data DI to $D_9$. Each of the data $D_1$ to $D_9$ corresponds to one of the transmitting sample data x(0), x(1), . . . , x(p). The data $D_1$ to $D_9$ are determined in the following manner.

When the transmitting sample data x(p) is input to the register 2-1, the register 2-1 captures and stores the data x(p). The "p" is an integer being not less than zero. The data $D_1$ becomes x(p). At this point, the data $D_2$ held by the register 2-2 becomes x(p−1). The data $D_3$ held by the register 2-3 becomes x(p−2).

Similarly, when the transmitting sample data x(p) is input to the register 2-1, data Dj held by the register 2-j becomes x(p−{j−1}). The "j" is a natural number being not more than nine. That is, when the transmitting sample data x(p) is input to the register 2-1, the register 2-j captures and stores data held by the register 2-(j−1).

The register 2-1 outputs its holding data DI to the multiplier 3-1. The register 2-2 outputs its holding data $D_2$ to the multiplier 3-2. Similarly, the register 2-j outputs its holding data Dj to the multiplier 3-j.

The multipliers 3-1 to 3-9 perform computations in response to the control signal "b". The multiplier 3-1 multiplies the data $D_1$ by a coefficient $A_1$ (q) and outputs the result to the adder 4. The multiplier 3-2 multiplies the data $D_2$ by a coefficient $A_2(q)$ and outputs the result to the adder 4. Similarly, the multiplier 3-j multiplies the data Dj by a coefficient $A_j(q)$.

The coefficients $A_1$ (q) to $A_9(q)$, used respectively by the multipliers 3-1 to 3-9, are determined by the control value δ(q), which is transferred to each of the multipliers 3-1 to 3-9. The coefficients $A_1(q)$ to $A_9(q)$ are obtained by an equation:

$$Aj(q) = \frac{\sin\{k+\delta(q)-j\}\pi}{\{k+\delta(q)-j\}\pi} h(k+\delta(q)-j) \tag{1}$$

where "k" is a natural number. In the embodiment, k=5.

The h(i) represents a window function, which maybe a Hamming function. That is, the window function may be given by the equation:

$$h(i)=0.54-0.46\cos(2\pi i/9) \tag{2}$$

Moreover, the window function "h(i)" may also be represented by a function other than the Hamming function. By using the Hamming function as the window function "h(i)" at a frequency being not more than a cut-off frequency, it is possible that the gain of the filter 1 is not influenced by frequencies. Moreover, the window function "h(i)" may also represent the value one.

The control value δ(q) is updated every time the clock pulse $P_q$ is input to the counter 8. Therefore, the coefficients $A_1(q)$ to $A_9$ (q) are also updated every time the clock pulse $P_q$ is input to the counter 8. The "q" is an arbitrary integer being not less than zero.

The adder 4 calculates the sum of computed results from each of the multipliers 3-1 to 3-9 and uses the sum as receiving sample data "y". The coefficients $A_1(q)$ to $A_9(q)$ that the multipliers 3-1 to 3-9 use for the multiplication are updated every time the clock pulse $P_q$ is input to the counter 8. The receiving sample data "y" is also updated every time each clock pulse from $P_0$ to $P_m$ is input to the counter 8. The receiving sample data "y" which is produced when the clock pulse $P_q$ is input to the counter 8 is hereinafter called "receiving sample data y(q)". The receiving sample data y(q) is given by the following equation:

$$y(q) = \sum_{j=1}^{9} Aj(q)Dj(q) \tag{3}$$

where the "$D_j(q)$" represents data which is held by the register 2-j when the clock pulse $P_q$ is input to the counter 8. Before the clock pulse $P_q$ has been input to the counter 8, the next sample data piece in the transmitting sample data x(0), x(1), . . . , x(p) . . . that is to be input to the register 2-1 is called the data x(p'). At this point, $D_1(q)=x(p')$. $D_2(q)=x$(p'−1). Similarly, $D_j(q)=x(p'-\{j-1\})$. That is, the following equation is obtained:

$$y(q) = \sum_{j=1}^{9} Aj(q)x(p'-(j-1)) \tag{4}$$

The adder 4 transfers the receiving sample data y(q) to the D/A converter 5 via the receiving signal c.

The receiving signal "c" is input to the D/A converter 5. To the D/A converter 5 is further input a receiving clock signal "d". The D/A converter 5 samples the receiving signal "c" in response to the receiving clock signal "d".

When the clock pulse $P_0$ is input to the D/A converter 5, the D/A converter 5 captures receiving sample data y(0). Similarly, when the clock pulse $P_q$ (q is an arbitrary integer being not less than zero) is input to the D/A converter 5, the D/A converter 5 captures receiving sample data y(q). The D/A converter 5 receives the receiving sample data y(q) every time the D/A converter 5 receives one clock pulse.

The D/A converter 5 produces an analog voice signal "e" using the receiving sample data y(q) contained in the captured receiving signal "c". The D/A converter 5 outputs an analog voice signal "e" to the speaker 6. The speaker 6 outputs a voice in response to the analog voice signal "e".

A main function of the signal receiving circuit of the embodiment is that the filter 1 produces the receiving sample data y(q) by using the above equation (4). Computations by the filter 1 using the equation (4) will be described below.

The coefficient $A_j(q)$, used for multiplication by the multipliers 3-1 to 3-9, incorporates a window function h (k+δ(q)−j) as a factor. The window function is related only to frequency characteristics. The window function has nothing to do with an essential operation of the filter 1. To simplify the explanation, let it be assumed that the window function h (k+δ(q)−j)=1.

Figure 3:
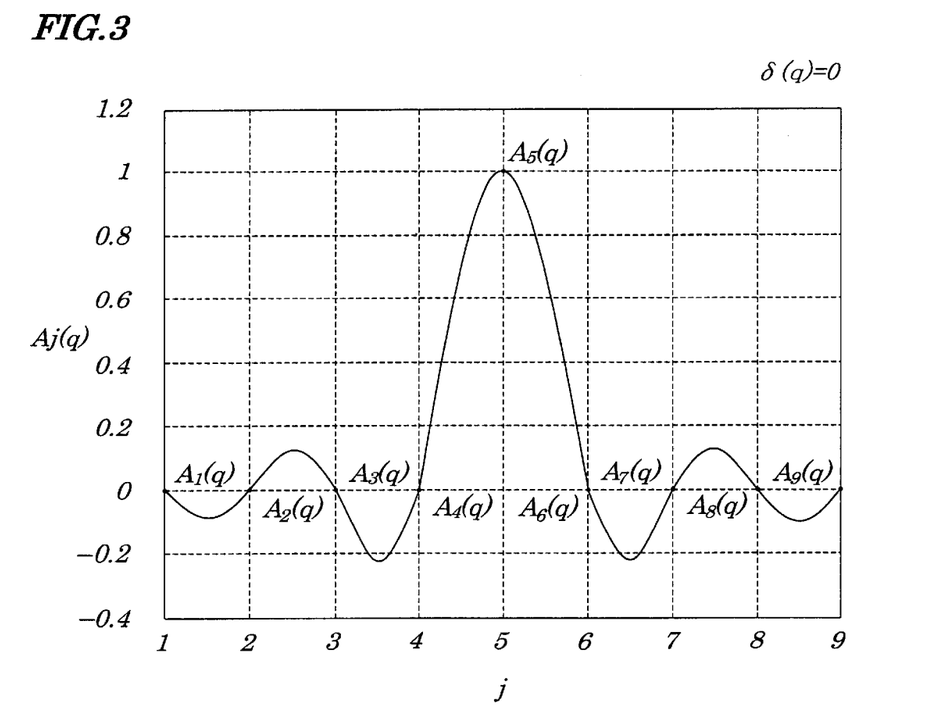
FIG. 3 is a diagram showing values of a coefficient $A_j(q)$ used when $\delta(q)=0$ and employed in the signal receiving circuit according to the embodiment of the present invention.

The following describes the scenario when δ(q)=0. FIG. 3 is a diagram showing values of the coefficient $A_j(q)$ used when δ(q)=0. In this case, the window function h(i)=1 and k=5. When j≠k, $A_j(q)=0$. When j=k, $A_j(q)=1$.

The equation y(q)=x(p'−(k−1)), that is, the equation y(q)= x(p'−4) can be derived from equation (4). The following describes this equation:

Here let it be assumed that δ(q)=0, the transmitting sample data x(p−4), x(p−3), x(p−2), x(p−1) and x(p) are input sequentially and, immediately after the inputting of the sample data, the clock 580 pulse $P_q$ is input to the counter 8 and further p'=p. At this point, the result is that y(q)=x (p−4).

That is, the filter 1 outputs the transmitting sample data x(p−4), which is input four pieces of sample data before x(p), as the receiving sample data y(q), in a delayed manner. Thus, when δ(q)=0, the filter 1 outputs the transmitting sample data that is input (k−1) pieces of sample data before x(p), as the receiving sample data y(q), in a delayed manner.

When δ(q)=0, each of the coefficients $A_j(q)$ ("j" is a natural number being one to nine) is determined so that the transmitting sample data input (k−1) pieces of sample data before x(p) is output in a delayed manner. The filter 1 performs computations of the transmitting sample data using the registers 2-1 to 2-9, multipliers 3-1 to 3-9 and adder 4. The result of the computation causes the transmitting sample data input (k−1) pieces of sample data before x(p) to be output in a delayed manner.

Figure 4:
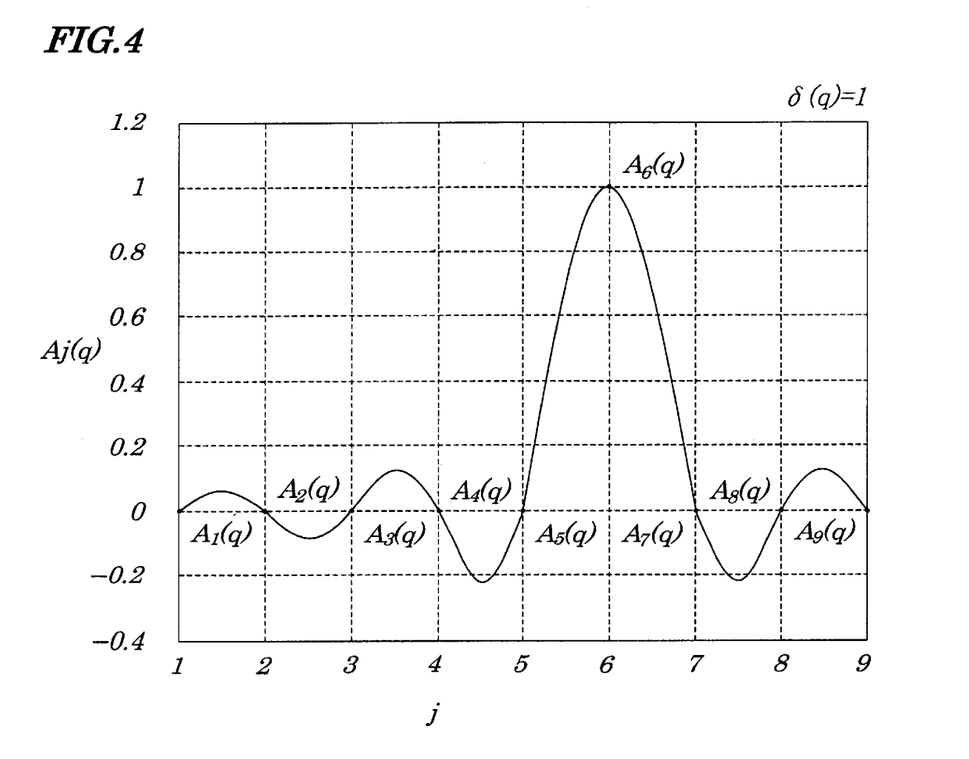
FIG. 4 is a diagram showing values of a coefficient $A_j(q)$ used when $\delta(q)=1$ and employed in the signal receiving circuit according to/the embodiment of the present invention.

FIG. 4 is a diagram showing values of the coefficient $A_j$ (q) used when δ(q)=1. Here, the window function h(i)=1 and k=5. Now, if j≠k+1 (=6), then $A_j(q)=0$. If j=k+1 (=6), then $A_j(q)=1$. The equation $y(q)=x(p'-5)$ can be derived from the equation (4). That is, when $\delta(q)=1$, the filter 1 outputs the transmitting sample data input five pieces of sample data before $x(p)$ as the receiving sample data $y(q)$, in a delayed manner. At this point, each of the coefficients $A_j(q)$ ("j" is a natural number being one to nine) is determined so that the transmitting sample data input five pieces of sample data before $x(p)$ is output in a delayed manner.

Figure 5:
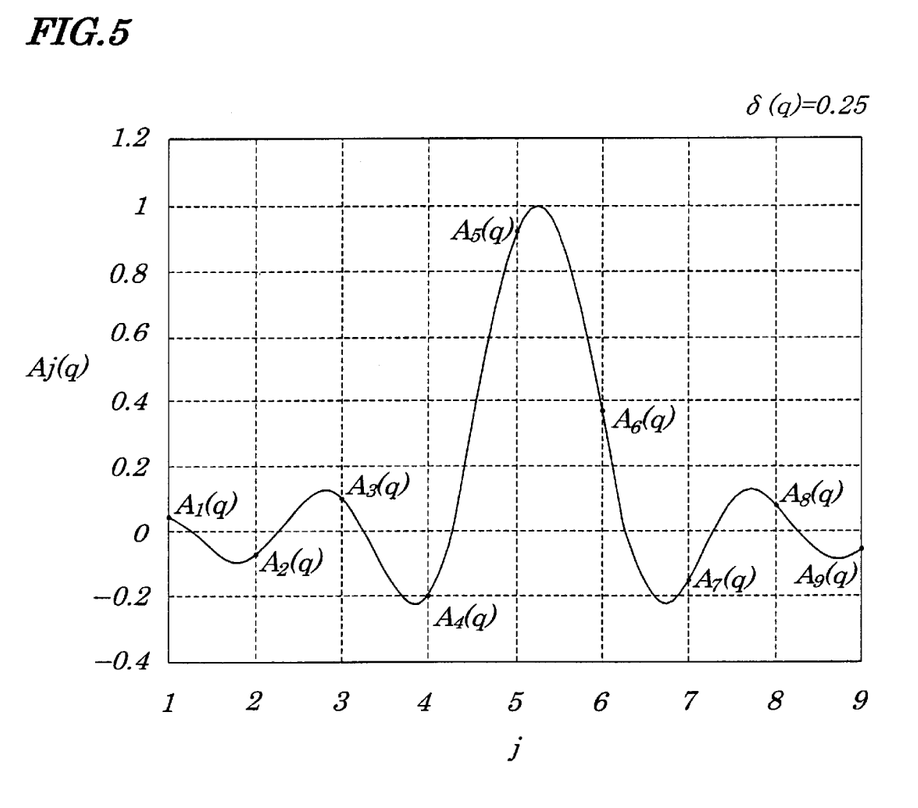
FIG. 5 is a diagram showing values of a coefficient $A_j(q)$ used when $\delta(q)=0.25$ and employed in the signal receiving circuit according to the embodiment of the present invention.

The above theory can be extended to the case where $\delta(q)$ is not an integer. FIG. 5 is a diagram showing values of the coefficient $A_j(q)$ used when $\delta(q)=0.25$. Here, k=5. At this point, each of the coefficients $A_j(q)$ ("j" is a natural number being one to nine) is determined so that the transmitting sample data input approximately 4.25 pieces of sample data before $x(p)$ is output in a delayed manner. The filter 1 outputs the transmitting sample data input approximately 4.25 pieces of sample data before $x(p)$ as the receiving sample data $y(q)$, in a delayed manner.

Thus, as described above, the filter 1 serves as a delaying unit adapted to output the transmitting sample data input" $(k-1)+\delta(q)$" pieces of sample data before $x(p)$ in a delayed manner. When $\delta(q)$ is not an integer, the filter 1 outputs the transmitting sample data input $(k-1)+\delta(q)$ pieces of sample data before $x(p)$ in a delayed manner.

The number of delayed samples $(k-1)+\delta(q)$ is calibrated according to the number of pieces of the transmitting sample data in the transmitting signal "a" that is input to the counter 8 and according to the number of clock pulses contained in the receiving clock signal "d" that is input to the counter 8.

Next, calibration of the number of delayed samples $(k-1)+\delta(q)$ will be described below.

In the embodiment, let it be assumed that k=5, Km=0, h(i)=1 and $\Delta x=0.2$. In the signal receiving circuit of the embodiment, after one piece of transmitting sample data is input to the filter 1, one clock pulse is input to the D/A converter 5 and one piece of receiving sample data is received.

In the signal receiving circuit, when one piece of the transmitting sample data is received on one clock pulse, the number of pieces of delayed samples in the filter 1 is calculated to be four. That is, the signal receiving circuit is configured so that, when the clock pulse $P_n$ is input to the counter 8 immediately after the transmitting sample data $x(m)$ has been input to the counter 8, the receiving sample data is $y(n)=x(m-4)$, $y(n+1)=x(m-3)$, $y(n+2)=x(m-2)$, ..., $y(n+7)=x(m+3)$. Here, $m \geq 4$.

However, let it be assumed that a clock pulse $P_{n+1}$ has been lost for some reason. The clock pulse $P_{n+1}$ corresponding to a transmitting sample data $x(m+1)$ is not input. At this time, the receiving sample data $y(n+1)$ is not produced. Operations of the signal receiving circuit in this situation will be explained by referring to FIG. 6. Let the counter value K be zero when time $t<t_m$.

Figure 6:
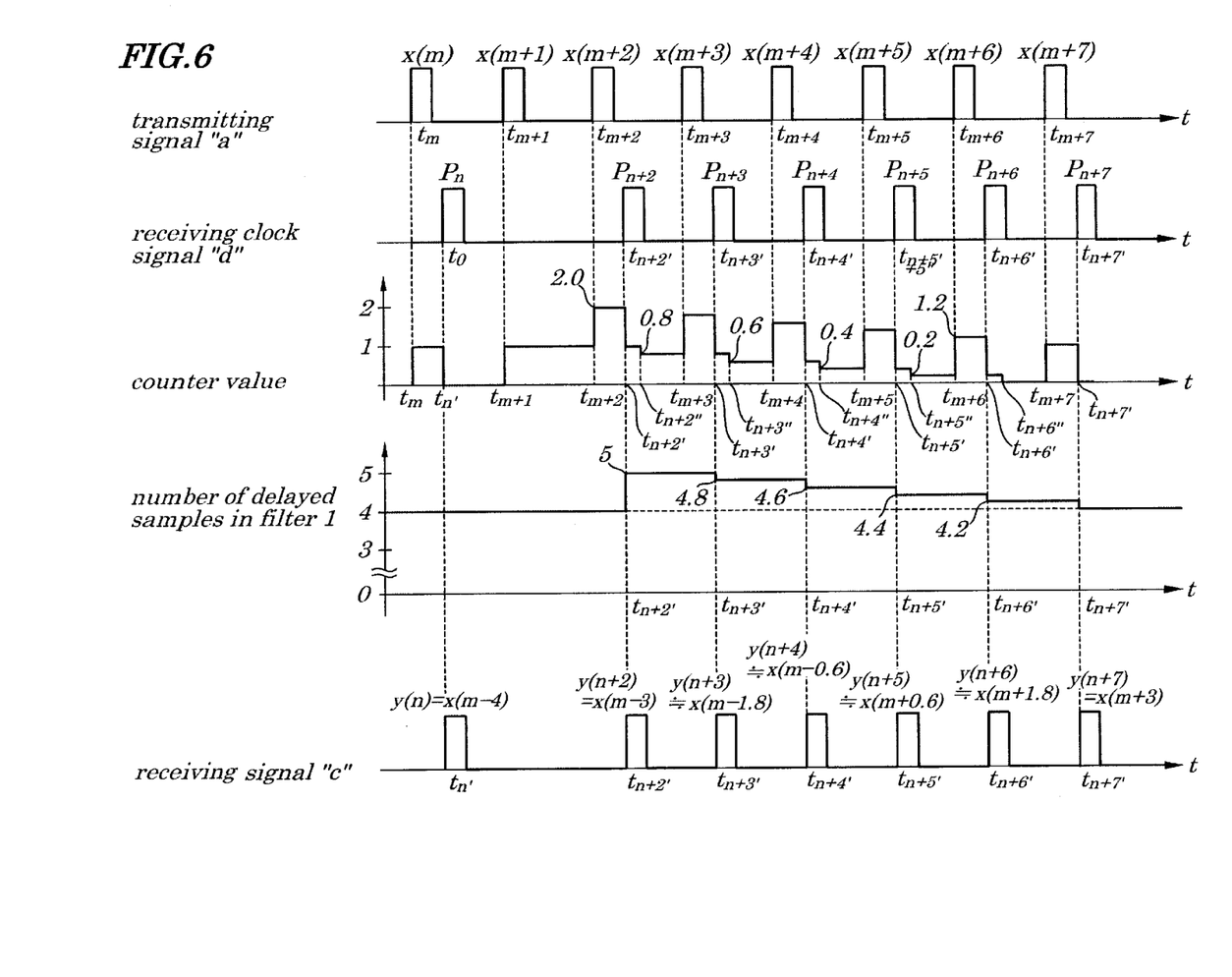
FIG. 6 is a diagram showing operations of the signal receiving circuit according to the embodiment of the present invention.

In the case of $t_m \leq t < t_{n+1}$:

At the time $t_m$, the transmitting sample data $x(m)$ is input to the filter 1 and the counter 8. The counter value K increments by one. K becomes one. Then, at the time $t_{n'}$, the clock pulse $P_n$ is input to the counter 8. The counter value K decrements by one. K becomes 0. $\delta(n)$ becomes zero.

At this point, the number of delayed samples "$\delta(n)+4$" in the filter 1 is four. As a result, $y(n)=x(m-4)$. The counter control signal "g" is input to the counter 8. It is neither that $\delta(n)>Km$, nor that $\delta(n)<Km$. The counter value K remains as it is.

In the case of $tm+1 \leq t < t_{m+3}$:

At the time $t_{m+1}$, the transmitting sample data $x(m+1)$ is input to the filter 1 and to the counter 8. The counter value increments by one. K becomes one. The clock pulse $P_{N+1}$ to be input following the transmitting sample data $x(m+1)$ is not input to the filter 1 and to the counter 8. The data $y(n+1)$ is not produced.

At the time $t_{m+1}$, the transmitting sample data $x(m+2)$ is input to the filter 1 and to the counter 8. The counter value K increments by one. K becomes two. Then, at the time $t_{n+2'}$, the clock pulse $P_{n+2}$ is input to the counter 8. The counter value K decrements by one. K becomes one. $\delta(n+2)$ becomes one. At this point, the number of delayed samples in the filter 1 "$\delta(n+2)+4$"=5. As a result, $y(n+2)=x(m-3)$. The counter control signal "g" is input to the counter 8. Here, $\delta(n+2)>Km\ (=0)$. At the time $t_{n+2'}$, the counter value K decrements by $\Delta x$. K becomes 0.8.

In the case of $t_{m+3} \leq t < t_{m+4}$:

At the time $t_{m+3}$, the transmitting sample data $x(m+3)$ is input to the filter 1 and to the counter 8. The counter value K increments by one. K becomes 1.8. Then, at the time $t_{n+3'}$, the clock pulse $P_{n+3}$ is input to the counter 8. The counter value K decrements by one. K becomes 0.8. As a result, $\delta(n+3)=0.8$.

At this point, the approximate number of delayed samples in the filter 1 "$\delta(n+3)+4$"=4.8. The receiving sample data $y(n+3)$ essentially becomes the data $x(m-1.8)$. In FIG. 6, when the receiving sample data $y(n+3)$ is equivalent to $x(m-1.8)$, it is expressed as $y(n+3)=x(m-1.8)$.

The counter control signal "g" is input to the counter 8. Here, $\delta(n+3)>Km\ (=0)$. At the time $t_{n+3'}$, the counter value K decrements by $\Delta x$. K becomes 0.6.

In the case of $t_{m+4} \leq t < t_{m+5}$:

At the time $t_{m+4}$, the transmitting sample data $x(m+4)$ is input to the filter 1 and the counter 8. K becomes 1.6. Then, at the time $t_{m+4'}$, the clock pulse $P_{n+4}$ is input to the counter 8. K becomes 0.6.

At this point, the approximate number of delayed samples in the filter 1 "$\delta(n+4)+4$"=4.6. The receiving sample data $y(n+4)$ essentially becomes the data $x(m-0.6)$.

Here, $\delta(n+4)>Km\ (=0)$. At the time $t_{n+4'}$, the counter value K decrements by $\Delta x$. K becomes 0.4.

In the case of $t_{m+5} \leq t < t_{m+6}$:

At the time $t_{m+5}$, the transmitting sample data $x(m+5)$ is input to the filter 1 and the counter 8. K becomes 1.4. Then, at the time $t_{n+5'}$, the clock pulse $P_{n+5}$ is input to the counter 8. K becomes 0.4.

At this point, the approximate number of delayed samples in the filter 1 "$\delta(n+5)+4$"=4.4. The receiving sample data $y(n+5)$ essentially becomes the data $x(m+0.6)$.

Here, $\delta(n+5)>Km\ (=0)$. At the time $t_{n+5''}$, the counter value K decrements by $\Delta x$. K becomes 0.2.

In the case of $t_{m+6} \leq t < t_{m+7}$:

At the time $t_{m+6}$, the transmitting sample data $x(m+6)$ is input to the filter 1 and the counter 8. K becomes 1.2. Then, at the time $t_{n+6'}$, the clock pulse $P_{n+6}$ is input to the counter 8. K becomes 0.2.

At this point, the approximate number of delayed samples in the filter 1 "$\delta(n+6)+4$"=4.2. The receiving sample data $y(n+6)$ essentially becomes the data $x(m+1.8)$.

Here, $\delta(n+6)>Km\ (=0)$. At the time $t_{n+6'}$, the counter value K decrements by $\Delta x$. K becomes zero.

In the case of $t \geq t_{m+7}$:

At the time $t_{m+7}$, the transmitting sample data $x(m+7)$ is input to the filter 1 and the counter 8. K becomes 1.0. Then, at the time $t_{n+7'}$, the clock pulse $P_{n+7}$ is input to the counter 8. K becomes zero.

At this point, the number of delayed samples in the filter 1 "$\delta(n+7)+4$"=4. The receiving sample data $y(n+7)=x(m+3)$. The receiving sample data $y(n+7)$ becomes the same as in the case where the clock pulse $P_{n+1}$ has not been lost.

In the signal receiving circuit of the embodiment, when the number of pieces of the transmitting sample data to be input to the filter 1 is equal to that of the clock pulses to be input to the D/A converter 5, the transmitting sample data is output in a delayed manner by four samples.

Moreover, the signal receiving circuit of the embodiment changes the number of delayed samples in the filter 1, by decreasing the number from five to four by $\Delta x(=0.2)$, when detecting that the number of the transmitting samples to be input to the filter 1 is larger by one than the number of the clock pulses to be input to the D/A converter 5. Thus, the receiving sample data $y(n)$, $y(n+1)$, . . . are continuously changed. When the transmitting sample data $x(m)$, $x(m+1)$, . . . and the receiving sample data $y(n)$, $y(n+1)$ . . . are digital signals, the analog voice signal "e" reproduced by the D/A converter 5 is not discontinuous.

Similarly, the signal receiving circuit of the embodiment changes the number of delayed samples in the filter 1, by increasing the number from three to four by $\Delta x(=0.2)$, when detecting that the number of the transmitting sample to be input to the filter 1 is smaller by one than the number of the clock pulses to be input to the D/A converter 5. Thus, the receiving sample data $y(n)$, $y(n+1)$, . . . are continuously changed.

The signal receiving circuit of the embodiment changes the number of delayed samples in the filter 1 by $\Delta x$ while $(1/\Delta x)$ pieces of the clock pulses $P_q$ are input, when detecting that the number of pieces of the transmitting sample data $x(0)$, $x(1)$, . . . , $x(p)$ . . . to be input to the counter 8 differs by one from the number of clock pulses $P_0$, $P_1$, $P_2$, . . . , $P_q$, . . . contained in the receiving clock signal "d" to be input to the counter 8.

Here, let it be assumed that the sampling frequency of the transmitting terminal differs slightly from the sampling frequency of the receiving terminal. At this time, the number of pieces of the transmitting sample data $x(0)$, $x(1)$, . . . , $x(p)$, . . . to be input to the counter 8 differs, at all times, from the number of clock pulses $P_0$, $P_1$, $P_2$, . . . , $P_q$, . . . contained in the receiving clock signal "d" to be input to the counter 8.

Here, let it be assumed that when the difference between the number of the transmitting sample data $x(p)$ to be input to the counter 8 and the number of the clock pulses $P_q$ contained in the receiving clock signal "d" to be input to the counter 8 becomes one, then the number of the clock pulses $P_q$ is defined to be "nP". In the signal receiving circuit of the embodiment, so long as $nP>1/\Delta x$, the receiving sample data $y(n)$, $y(n+1)$, . . . can be continuously changed.

For example, let it be assumed that, when signals are transmitted or received at the sampling frequency of 16 kHz, a difference of 40 Hz occurs between the sampling frequency $N_1$ 16040 Hz of the transmitting terminal and the sampling frequency $N_2$ 16000 Hz of the receiving terminal. If so, every 400 times the receiving terminal receives a signal, in other words, every 400 samples received, the number of pieces of the transmitting sample data to be transmitted by the transmitting terminal differs from the number of pieces of the receiving sample data to be received by the receiving terminal by one. At this point, so long as $400>(1/\Delta x)$, that is, $\Delta x>0.0025$, the signal receiving circuit of the embodiment can continuously change the receiving sample data $y(n)$, $y(n+1)$, . . . .

It is preferable that the value $\Delta x$ is as small as possible within a range that meets the condition $nP>1/\Delta x$, so that the receiving sample data $y(n)$, $y(n+1)$, can be continuously changed. Specifically, for digital voice communication in which signals are transmitted or received at the sampling frequency of 16 kHz, it is preferable that the value "$1/\Delta x$" is equal to about 256.

It is apparent that the present invention is not limited to the above embodiments but may be changed and modified without departing from the scope and spirit of the invention. For example, in the above embodiment, the signal receiving circuit is used to receive a digital voice signal. However, the signal receiving circuit may also be used to receive other signals, such as digital image signals between communication terminals that are not in sync with each other. Moreover, the signal receiving circuit of the embodiment may be used as a signal receiving circuit in which, though complete reproduction of a transmitted signal is not required, continuity in signal waveforms and on a time axis is required.

What is claimed is:

1. A signal receiving circuit comprising:

a converting circuit to perform computations on $n_1$ ($n_1$ is a natural number) pieces of first sample data sequentially input and to sequentially produce $n_2$ ($n_2$ is a natural number) pieces of second sample data in response to a clock signal;

a receiving circuit to sequentially receive said $n_2$ pieces of said second sample data in response to said clock signal;

wherein said number $n_2$ is determined by said clock signal; and, wherein said converting circuit outputs, in accordance with a difference between a number of said first sample data input to said converting circuit and a number of said second sample data to be received by said receiving circuit, one previously input piece of said first sample data as one piece of said second sample data included in said $n_2$ pieces of said second sample data, in a delayed manner.

2. The signal receiving circuit according to claim 1, wherein said one piece of said second sample data is said previously input piece of said first sample data input N pieces of sample data before a currently input piece of said first sample data and output in a delayed manner and wherein said value N is a positive number being not less than 0 (zero) and is able to be a value other than an integer.

3. The signal receiving circuit according to claim 1, further comprising:

a controller used to produce a control signal in response to said number $n_1$ and said number $n_2$, determined by said clock signal, and said converting circuit includes a computational section used to perform a computation on said plurality of pieces of said first sample data in response to said control signal and to produce said $n_2$ pieces of said second sample data.

4. The signal receiving circuit according to claim 3, wherein said computational section has a plurality of storing sections each being used to store one different piece of said first sample data included in said plurality of pieces of said first sample data, a plurality of multipliers each being used to output a computational result obtained by multiplying one different piece of said first sample data by a predetermined coefficient $A_j$ and an adder used to do addition of said computational results to obtain a sum and to output said sum as one piece of said second sample data included in said plurality of pieces of said second sample data.

5. The signal receiving circuit according to claim 4, wherein said predetermined coefficient $A_j$ used in said plurality of said multipliers is obtained by an equation:

$$Aj = \frac{\sin(k+\delta-j)\pi}{(k+\delta-j)\pi} h(k+\delta-j)$$

where "n" is a number of multipliers making up said plurality of said multipliers, "j" is an integer from 1 to said "n", "k" is a natural number being larger than 1 and being smaller than said "n", and "h(i)" represents a window function wherein said value "δ" is determined in response to said control signal.

6. The signal receiving circuit according to claim 5, wherein said "h(i)" is a Hamming function.

7. The signal receiving circuit according to claim 5, wherein, every time said receiving circuit receives said second sample data, a difference ($N_1$–$N_2$) between a number $N_1$ of said first sample data to be input to said converting circuit for a specified period and a number $N_2$ of said second sample data to be received by said receiving circuit for said specified period is used to determine said value "δ" and, every time said receiving circuit receives said second sample data, said value "δ" comes close to 0 (zero) by a specified value.

8. The signal receiving circuit according to claim 4, wherein said predetermined coefficient $A_j$ used in said plurality of said multipliers is obtained by an equation:

$$Aj = \frac{\sin(k+\delta-j)\pi}{(k+\delta-j)\pi}$$

where "n" is a number of multipliers making up said plurality of multipliers, "j" is an integer from 1 to "n" and "k" is a natural number being larger than 1 and being smaller than "n" wherein said value "δ" is determined in response to said control signal.

9. The signal receiving circuit according to claim 8, wherein, every time said receiving circuit receives said second sample data, a difference ($N_1$–$N_2$) between a number $N_1$ of said first sample data to be input to said converting circuit for a specified period and a number $N_2$ of said second sample data to be received by said receiving circuit for said specified period is used to determine said value "δ" and, every time said receiving circuit receives said second sample data, said value "δ" comes close to 0 (zero) by a specified value.

10. The signal receiving circuit according to claim 1, wherein said $n_1$ pieces of said first sample data and said $n_2$ pieces of said second sample data are digital voice data.

11. A method for receiving signals comprising:
a step of performing sequential computations on $n_1$ ($n_1$ is a natural number) pieces of first sample data to determine output of second sample data;
a step of producing $n_2$ ($n_2$ is a natural number) pieces of said second sample data in response to a clock signal;
a step of sequentially receiving said second sample data in response to said clock signal;
wherein said number $n_2$ is determined by said clock signal; and
wherein said step of producing $n_2$ pieces of second sample data includes a step of outputting, in accordance with a difference between a number of said first sample data and a number of said second sample data to be received by said receiving circuit, one previously input piece of said first sample data as one piece of said second sample data included in said $n_2$ pieces of said second sample data, in a delayed manner.

12. The method for receiving signals according to claim 11, wherein said one piece of said second sample data is said previously input piece of said first sample data input N pieces of sample data before a currently input piece of said first sample data and output in a delayed manner and wherein said value N is a positive number being not less than 0 (zero) and is able to be a value other than an integer.

13. The method for receiving signals according to claim 11, wherein, said $n_1$ pieces of said first sample data and said $n_2$ pieces of said second sample data are digital voice data.

14. The method for receiving signals according to claim 11, wherein said step of producing said $n_2$ pieces of second sample data includes a step of using a value y calculated by an equation:

$$y = \sum_{j=1}^{n} \frac{\sin(k+\delta-j)\pi}{(k+\delta-j)\pi} Dj$$

as one piece of said second sample data included in said $n_2$ pieces of said second sample data, where each of $D_1$, $D_2$, . . . , $D_n$ (n is a natural number being not less than 2) is a value of each of said plurality of pieces of said first sample data, "j" is an integer from 1 to "n", "k" is a natural number being larger than 1 and smaller than "n" and wherein said step of producing said $n_2$ pieces of second sample data includes a step of calibrating said value "δ" being a number determined in accordance with a difference between said number $n_1$ and said number $n_2$.

15. The method for receiving signals according to claim 14, wherein, every time said second sample data is received in response to a clock signal, a difference ($N_1$–$N_2$) between a number $N_1$ of said first sample data to be input for a specified period and a number $N_2$ of said second sample data to be received for said specified period is used to determine said value "δ" and, every time said second sample data is received in response to a clock signal, said value "δ" comes close to 0 (zero) by a specified value.

16. The method for receiving signals according to claim 11, wherein said step of producing said $n_2$ pieces of second sample data includes a step of using a value y calculated by an equation:

$$y = \sum_{j=1}^{n} \frac{\sin(k+\delta-j)\pi}{(k+\delta-j)\pi} h(k+\delta-j) Dj$$

as one piece of said second sample data included in said $n_2$ pieces of said second sample data, where each of $D_1$, $D_2$, . . . , $D_n$ (n is a natural number being not less than 2) is a value of each of said plurality of pieces of said first sample data, "j" is an integer from 1 to "n", "k" is a natural number being larger than 1 and smaller than "n" and "h(i)" represents a window function and wherein said step of producing said $n_2$ pieces of second sample data includes a step of calibrating said value "a" being a number determined in accordance with a difference between said number $n_1$ and said number $n_2$.

17. The method for receiving signals according to claim 16, wherein said value "h(i)" is a Hamming function.

18. The method for receiving signals according to claim 16, wherein, every time said second sample data is received in response to a clock signal, a difference ($N_1-N_2$) between a number $N_1$ of said first sample data to be input for a specified period and a number $N_2$ of said second sample data to be received for said specified period is used to determine said value "δ" and, every time said second sample data is received in response to a clock signal, said value "δ" comes close to 0 (zero) by a specified value.

* * * * *